(12) United States Patent
Liu et al.

(10) Patent No.: US 7,995,090 B2
(45) Date of Patent: Aug. 9, 2011

(54) VIDEO ENABLED TELE-PRESENCE CONTROL HOST

(75) Inventors: Qiong Liu, Milpitas, CA (US); Donald G Kimber, Montara, CA (US); Jonathan T Foote, Menlo Park, CA (US); Chunyuan Liao, Greenbelt, MD (US); Patrick Chiu, Menlo Park, CA (US); Lynn Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1719 days.

(21) Appl. No.: 10/629,403

(22) Filed: Jul. 28, 2003

(65) Prior Publication Data

US 2005/0028221 A1  Feb. 3, 2005

(51) Int. Cl.
*H04N 7/15* (2006.01)

(52) U.S. Cl. ............ 348/14.01; 715/734; 715/753; 709/205; 725/143; 348/14.08

(58) Field of Classification Search ............ 348/E7.063, 348/E7.083, 14.01–14.1; 709/217, 204–207; 715/717, 748, 751, 753–759, 856–863; 455/519
See application file for complete search history.

(56) References Cited

U.S. PATENT DOCUMENTS

| | | | |
|---|---|---|---|
| 4,566,036 A | 1/1986 | Kadosawa | |
| 4,928,301 A | 5/1990 | Smoot | |
| 5,114,227 A | 5/1992 | Cleveland, Jr. | |
| 5,504,520 A | 4/1996 | Yamamoto | |
| 5,523,783 A | 6/1996 | Cho | |
| 5,528,289 A | 6/1996 | Cortjens et al. | |
| 5,737,431 A | 4/1998 | Brandstein et al. | |
| 5,757,424 A | 5/1998 | Frederick | |
| 5,960,411 A | 9/1999 | Hartman et al. | |
| 6,452,628 B2 | 9/2002 | Kato et al. | |
| 6,463,343 B1 * | 10/2002 | Emens et al. | 700/83 |
| 6,476,868 B1 | 11/2002 | Kaji et al. | |
| 6,480,889 B1 | 11/2002 | Saito et al. | |
| 6,556,875 B1 | 4/2003 | Nagasaka et al. | |
| 6,624,846 B1 | 9/2003 | Lassiter | |
| 6,677,979 B1 * | 1/2004 | Westfield | 348/14.12 |

(Continued)

FOREIGN PATENT DOCUMENTS

JP          9-128310          5/1997

(Continued)

OTHER PUBLICATIONS

Burt et al. "Object tracking with a moving camera", IEEE An Application of Dynamic Motion Analysis. 1989 pp. 2-12.*

(Continued)

*Primary Examiner* — Andrew Y Koenig
*Assistant Examiner* — Jasmine Stokely-Collins
(74) *Attorney, Agent, or Firm* — Fliesler Meyer LLP

(57) ABSTRACT

A method for exchanging information in a shared interactive environment, comprising selecting a first physical device in a first live video image wherein the first physical device has information associated with it, causing the information to be transferred to a second physical device in a second live video image wherein the transfer is brought about by manipulating a visual representation of the information, wherein the manipulation includes interacting with the first live video image and the second live video image, wherein the first physical device and the second physical device are part of the shared interactive environment, and wherein the first physical device and the second physical device are not the same.

38 Claims, 7 Drawing Sheets

U.S. PATENT DOCUMENTS

| | | | | |
|---|---|---|---|---|
| 6,711,590 | B1* | 3/2004 | Lennon | 707/200 |
| 6,977,672 | B1* | 12/2005 | Okuno | 348/207.11 |
| 7,010,751 | B2* | 3/2006 | Shneiderman | 715/232 |
| 7,185,054 | B1* | 2/2007 | Ludwig et al. | 709/204 |
| 7,188,139 | B1* | 3/2007 | Ayatsuka et al. | 709/204 |
| 2002/0054216 | A1 | 5/2002 | Kawashima | |
| 2002/0075282 | A1* | 6/2002 | Vetterli et al. | 345/632 |
| 2002/0111999 | A1* | 8/2002 | Andersson | 709/203 |
| 2004/0017386 | A1 | 1/2004 | Liu et al. | |
| 2004/0070608 | A1* | 4/2004 | Saka | 345/748 |
| 2004/0070616 | A1* | 4/2004 | Hildebrandt et al. | 345/764 |
| 2004/0236830 | A1* | 11/2004 | Nelson et al. | 709/204 |

FOREIGN PATENT DOCUMENTS

| | | |
|---|---|---|
| JP | 11-96131 | 4/1999 |
| JP | 10-192682 | 1/2000 |
| JP | 2000222341 | 8/2000 |
| JP | 2001-142825 | 5/2001 |

OTHER PUBLICATIONS

Chang, Bay-Wei, et al., "Fluidly Revealing Information in Fluid Documents," AAAI Smart Graphics Spring Symposium, Stanford University, 2000, pp. 178-181.

Bederson, Benjamin B., et al., "Jazz: An Extensible Zoomable User Interface Graphics Toolkit in Java," Proceedings of the $13^{th}$ Annual ACM Symposium on User Interface Software and Technoloogy, CHI Letters, vol. 2, No. 2, Nov. 2000, pp. 171-180.

Bickmore, T.W., et al., "Digestor: device-independent access to the World Wide Web," Computer Networks and ISDN Systems, vol. 29, pp. 1075-1082, Sep. 1997, also appears in Proceedings for the Sixth International World Wide Web Conference, Apr. 7-11, 1997, pp. 655-663.

Carr, Leslie, et al., "Writing and Reading Hypermedia on the Web," Technical Report No. ECSTR-IAM00-1, University of Southampton, UK, Feb. 2000, http://www.bib.ecs.soton.ac.uk/data/3368/html/WRWH.html, pp. 1-13.

Hill, W.C., et al., "Edit Wear and Read Wear," CHI'92, May 1992, pp. 3-9.

Hightower, R.R., et al., "Graphical Multiscale Web Histories: A Study of PadPrints," ACM Conference on Hypertext and Hypermedia, Jun. 1998, pp. 58-65.

Myers, Brad A., et al., "Interacting at a Distance Using Semantic Snarfing," ACM UbiComp 2001: Ubiquitous Computing, Atlanta, Georgia, Sep. 30-Oct. 2, 2001, pp. 305-314.

Myers, Brad A., "Using Handhelds and PCs Together," Communications of the ACM, vol. 44, Issue 11, Nov. 2001, pp. 34-41.

Robertson, George, et al., "The Task Gallery: A 3D Window Manager," CHI2000, CHI Letters, vol. 2, Issue 1, Apr. 2000, pp. 494-501.

Wobbrock, Jacob O., et al., "WebThumb: Interaction Techniques for Small-Screen Browsers," UIST'02, Oct. 27-30, 2002, pp. 205-208.

Woodruff, A., et al., "Using Thumbnails to Search the Web," CHI2001, Conference on Human Factors in Computing Systems, Mar. 31-Apr. 5, 2001, pp. 198-205.

Intuos, the intelligent graphics tablet system, Wacom, www.wacom.com/productinfo/.

Graphire, Intuos USB, Wacom, www.wacom.com/index2.html.

DeepSea Power & Light, Pan/Tilt/Zoom 2001, www.deepseacom/ptz2001.html.

3Space®Products, Polhemus, First in the third dimension, www.polhemus.com/welcome.htm.

Xerox touts DataGlyphs for paper data, Seybold Report on Desktop Publishing, vol. 9, No. 5, www.seyboldseminars.com/seybold_report/reports/D0905001.HTM.

Swaminathan, R. and Nayar, S.K., Polycameras: Camera Clusters for Wide Angle Imaging, CUCS-013-99, Department of Computer Science, Columbia University, New York, New York 10027, srahul@cs.columbia.edu; nayar@cs.columbia.edu.

Fitzmaurice, G.W., Ishii, H., and Buxton, W., Bricks: Laying the Foundations for Graspable User Interfaces, Proceedings of CHI '95, pp. 442-449.

Kimiya Yamaashi, Jeremy R. Cooperstock, Tracy Narine, and William Buxton; "Beating the Limitations of Camera-Monitor Mediated Telepresence with Extra Eyes," Proc. Of ACM CHI96, Vancouver, British Columbia,1996, 14 pgs.

Liwei He, Elizabeth Sanocki, Anoop Gupta, and Jonathan Grudin, "Auto-Summarization of Audio-Video Presentations," ACM International Multimedia Conf. (mm 99), Orlando, FL, Oct. 1999, 10 pgs.

Michael H. Bianchi, "AutoAuditorium: a Fully Automatic, Multi-Camera System to Televise Auditorium Presentations," Proc. Of Joint DARPA/NIST Smart Spaces Technology Workshop, Gathersburg, MD, Jul. 1998, pp. 1-10.

Qian Huang, Yuntao Cui, Supun Samarasekera, "Content Based Active Video Data Acquisition Via Automated Cameramen," Proc. IEEE International Conference on Image Processing (ICIP), Chicago, IL, Oct. 1998, 5 pgs.

Qiong Liu, Yong Rui, Anoop Gupta, and JJ Cadiz,"Automating Camera Management for Lecture Room Environments," Proceedings of ACM CHI2001, vol. 3, pp. 442-449, Seattle, Washington, U.S.A., Mar. 31-Apr. 5, 2001.

Paulos, Eric and Canny, John, "Social Tele-Embodiment: Understanding Presence," Autonomous Robots 11, 87-95, 2001.

Leigh, Jason, et al, "AccessBot: an Enabling Technology for Telepresence", in CDROM of Proc. INET 2000, Jul. 18-21, 2000.

Tani, Masayuki, et al., "Object-oriented Video: Interaction With Real-World Objects Through Live Video", May 3-7, 1992 ACM -089791-513-5/92/0005-0593.

Harry F. Silverman, William R. Paterson III, James L. Flanagan, Daniel Rabinkin; *A Digital Processing System For Source Location and Sound Capture by Large Microphone Arrays*, 4 pgs., In Proceedings of ICASSP 97, Munich, Germany, Apr. 1997.

Daniel V. Rabinkin, *Digital Hardware and Control for a Beam-Forming Microphone Array*, M.S. Thesis, Electrical and Computer Engineering, Rutgers University, pp. 1-70, New Brunswick, New Jersey, Jan. 1994.

Bill Kapralos, Michael R. M. Jenkin, Evangelos Milios, *Audio-Visual Localization of Multiple Speakers in a Video Teleconferencing Setting*, Technical Report CS-2002-02, pp. 1-70, Department of Computer Science, York University, Ontario, Canada, Jul. 15, 2002.

Khotake, Naohiko, et al., "InfoPoint: A Direct-Manipulation Device for Inter-Applicance Computing," http://www.csl.sony.co.jp/person/rekimoto/iac/.

Fjeld, M., et al., "Camera control in a planar, graspable interface", $17^{th}$ IASTED International Conference on Applied Informatics (AI'99), pp. 243-245.

Japanese Office Action dated May 18, 2010 in re: Japanese Patent Application No. 2004-217493, 3 pages.

Translation of Japanese Office Action dated May 18, 2010 in re: Japanese Patent Application No. 2004-217493, 4 pages.

Translation of Abstract of Publication No. JP9128310, 1 page.

\* cited by examiner

VIDEO ENABLED TELE-PRESENCE CONTROL HOST

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the following co-pending applications which are each hereby incorporated by reference in their entirety:

SYSTEMS FOR CONTROLLING VIDEO OR MOTION CAMERAS, U.S. application Ser. No. 09/391,141, Inventors: Jon Foote, et al., filed on Sep. 7, 1999.

SYSTEMS AND METHODS FOR USING INTERACTION INFORMATION TO DEFORM REPRESENTATIONS OF DIGITAL CONTENT, U.S. application Ser. No. 10/672,980, Inventors: Laurent Denoue, et al., filed on Sep. 26, 2003.

REMOTE AUDIO DEVICE MANAGEMENT SYSTEM, U.S. application Ser. No. 10/612,429, Inventors: Qiong Liu, et al., filed on Jul. 2, 2003.

COMPUTER-ASSISTED MEETING CAPTURING SYSTEM, U.S. application Ser. No. 09/981,735, Inventors: Shingo Uchihashi, et al., filed on Feb. 16, 2001.

VIDEO PRODUCTION THROUGH COLLABORATIVE CONTROL OF FLYSPECS, U.S. application Ser. No. 10/205,739, Inventors: Qiong Liu, et al., filed on Jul. 26, 2002.

TELEPRESENCE SYSTEM AND METHOD FOR VIDEO TELECONFERENCING, U.S. application Ser. No. 10/617,549, Inventors: Jonathan T. Foote et al., filed on Jul. 11, 2003.

FIELD OF THE DISCLOSURE

The present invention disclosure relates to a graphical computer interface which allows one or more users to interact with one or more real-world devices via by interacting with video images of the devices and their environment.

BACKGROUND

Interacting with the real world can be accomplished in various ways. At one extreme, a person can interact with it directly (e.g., push a door to open it). At another extreme, a person can interact with the real world through various levels of indirection such as with a control panel or a software program. Although direction interaction with the real world is probably the most intuitive way for a person to affect changes, sometimes such interaction is not possible due to dangerous conditions (e.g., manipulation of nuclear fuel), problems of scale (e.g., manipulation of the interior of a single cell organism), and problems of distance (e.g., teleconferencing).

Teleconferencing over the Internet is increasingly popular for many applications, such as distance learning. Through remote participation, students can attend classes from their dorm rooms, scientists can participate in seminars held in other countries, and executives can discuss critical issues without leaving their offices. There are many ways to support such activities: one-way audio broadcast, two-way audio communication, and two-way video communication. However, each is limited in the amount of intuitive interaction afforded to the participants.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical, optical, and/or biological components of a processor and its subsystems.

Various operations will be described as multiple discrete steps in turn, in a manner that is most helpful in understanding the present invention, however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

Figure 1:
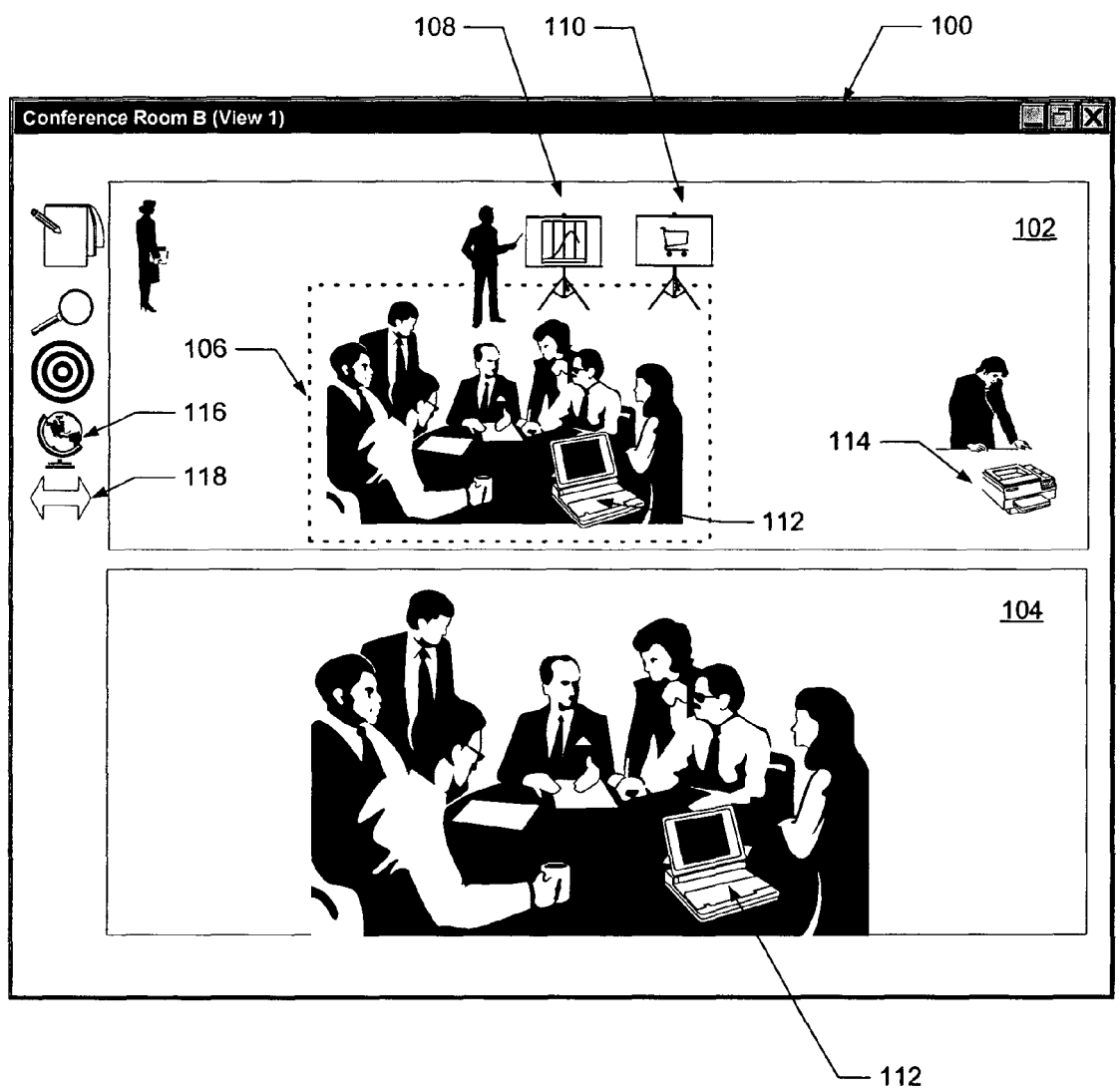
FIG. 1 is an illustration of a graphical user interface (GUI) in one embodiment.

FIG. 1 is an illustration of a graphical user interface (GUI) in one embodiment. Window 100 displays two live video images of the same physical location (e.g., a conference room). In one embodiment, a live video image may be updated at a low frame rate due to network bandwidth limitations, for example. In another embodiment, a live video image may only be updated as necessary to reflect any changes in the image. In yet another embodiment, a live video image consists of a stream of delta images that represents changes to an original image.

For purposes of clarity, video images are depicted in this illustration with simple drawings rather than with bitmaps of actual video signals. The drawings emphasize the physical devices that would be visible from the video images. The upper window 102 displays a panoramic video view of the location whereas the lower window 104 presents a close-up (or zoom) video view of a region 106 in the panoramic view. The zoom region can be any region in the panoramic view. The smaller the zoom region, the greater the magnification will be in the zoom view. In another embodiment, the zoom region can also be in the zoom view. In this case, the zoom view can be further magnified to show only the zoom region. In the location shown by the views, a number of devices are visible. A device can be controlled and/or manipulated over a communication channel (e.g., IEEE 802.11, Internet, Bluetooth®, Infrared, etc.) By way of a non-limiting illustration, panoramic view 102 contains two displays (108 and 110), a portable computer 112 and a printer 114. There may also be other devices, such as speakers, microphones, lights, etc. Users (or participants) can interact with these physical devices through use of the GUI, as will be illustrated.

By way of a non-limiting example, the GUI can run as an application in a web browser, a stand-alone application or as a combination of the two. In one embodiment, the GUI can be implemented as a Java™ applet. The Java programming language and run-time environment are available from Sun Microsystems, Inc. of San Jose, Calif. The GUI can run on any computing device that can connect to a network such as, and by way of a non-limiting-example, the Internet. By way of a further non-limiting example, the device could be a personal computer, a laptop or tablet computer, a personal data assistant (PDA), a mobile phone, a personal communication device, a wearable computing device, etc. Display devices can include plasma poster boards, projectors, video monitors, televisions, image projection systems, electronic whiteboards, etc.

The video streams are provided to the views (102, 104) by a special camera system (hereinafter referred to as "FlySPEC") that includes a panoramic camera and a pan-tilt-zoom (PTZ) camera. The panoramic camera is fixed and provides a panoramic view of a location whereas the PTZ camera is able to pan, tilt and zoom which enables it to magnify portions of the location beyond the resolution of the panoramic camera. In one embodiment, the panoramic camera is constructed with two normal fixed cameras, and the PTZ camera is mounted on top of the panoramic camera. By locating the PTZ camera close to the panoramic camera, the coordinate system used by the PTZ camera can be approximated with the coordinate system used by the panoramic camera when a device of interest is relatively far away from the cameras. With such coordinate approximation, there is no need for a complicated coordinate transformation from the panoramic camera to the PTZ camera for purposes of moving the PTZ camera. In another embodiment, both cameras can have independent coordinates systems and a function can be provided to map from one system to the other.

In one embodiment, the FlySPEC panoramic camera can cover about 100° field-of-view with two fixed cameras. Each fixed camera can have a 58° field of view and a ¼" 512 by 492 color CCD sensor. The PTZ camera can have a 48.8° filed-of-view, a ⅓" 768 by 492 color CCD sensor, and 12X optical zoom. Since the PTZ camera can pan from −100° to +100°, and tilt from −25° to +25°, it can move to all positions covered by the panoramic system. Since the smallest filed of view for the PTZ camera is about 4.4°, the maximum magnification that the PTZ camera can achieve in one embodiment is approximately $$Magnification_{max} = \frac{58 \times 768}{4.4 \times 512} = 19.77$$

This means that a 39×25 image captured by the panoramic camera can be enlarged to a 768×492 image by the PTZ cam. In another embodiment, a higher magnification PTZ camera can be employed.

The present disclosure is not limited to having a single FlySPEC in a single location. Furthermore, the present disclosure contemplates multiple users accessing a given FlySPEC from different GUI's on different devices. When more than one user is utilizing a FlySPEC, conflicts may arise regarding use of the PTZ camera since different users may want to focus on different zoom regions. In one embodiment, a management algorithm coordinates conflicting camera commands. Commands from users are separated into groups of similar view requests. The PTZ camera can zoom in and allow users to see small devices clearly. On the other hand, the panoramic camera can provide different video streams to multiple users simultaneously, and can provide reasonable video for a wide field of view. A coordination algorithm uses the PTZ camera to serve the group with the most demanding (i.e., requesting highest zoom-in) image requests, and scales the panoramic camera image stream to serve general uses who do not need as much resolution.

Referring again to FIG. 1, there are user-selectable controls available for allowing a user to cycle through FlySPEC cameras within a given location, and to change locations. In one embodiment, the physical location of the FlySPEC in use by the GUI is evident from the window 100 title bar ("Conference Room B") as is the FlySPEC within the location ("View 1"). In another embodiment, a FlySPEC camera can be mounted on a mobile platform, such as a robot or other device, so that it can be repositioned within a given location, or change locations entirely. User-selectable control 116 will allow the user to change the physical location. By way of a non-limiting illustration, it may do so by providing the user with an interactive map of all potential locations. It may also allow the user to choose a FlySPEC within the new location as part of the location selection process. Alternatively, the GUI can connect to a FlySPEC in the new location that has been designated as the default or initial view. User-selectable control 118 allows the user to change FlySPEC cameras within a given location (if there is more than one) thus allowing the user to cycle through each FlySPEC until a desired view is achieved.

Figure 2:
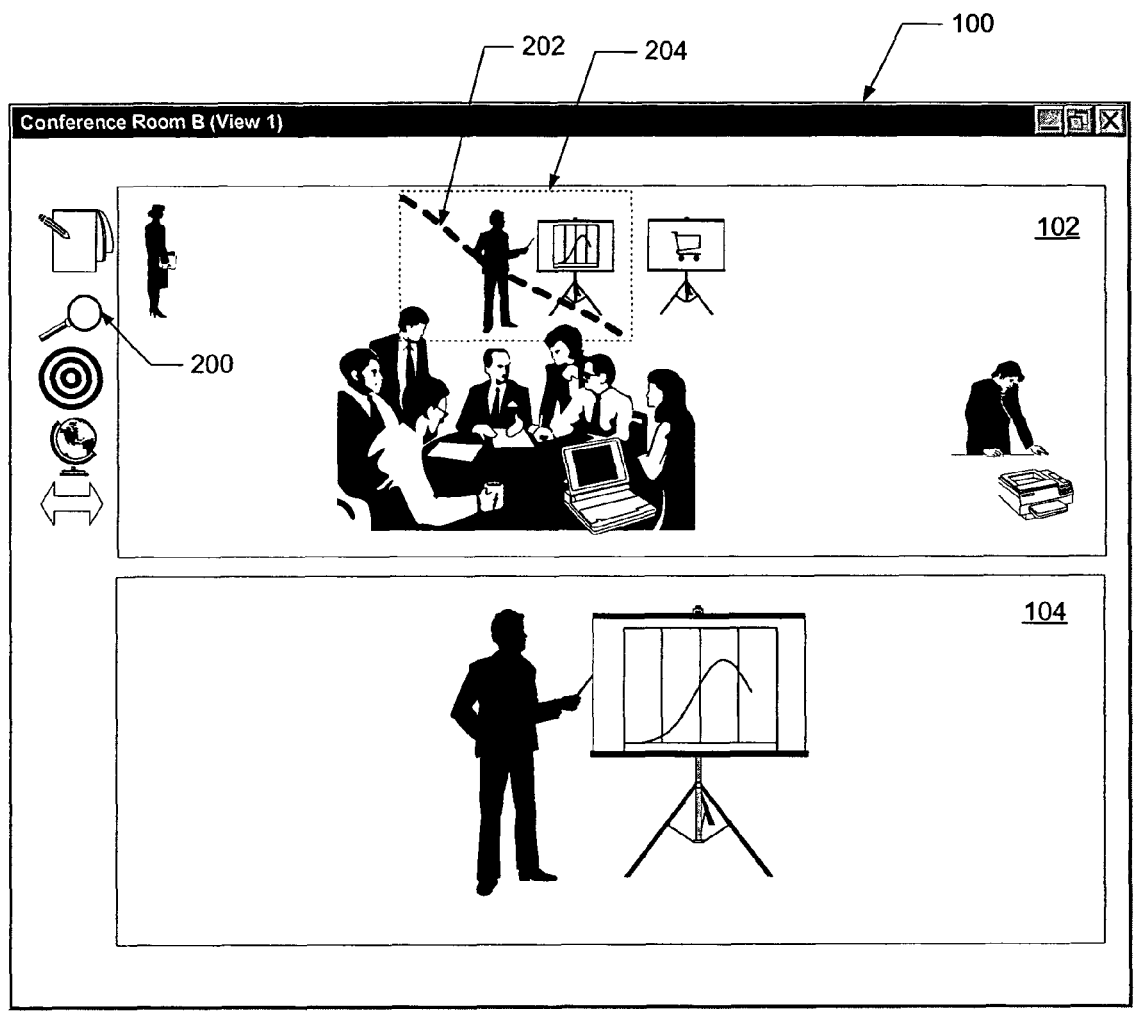
FIG. 2 is an illustration of selection of a zoom region in one embodiment.

A user interacting with the GUI can choose the zoom region using any of a number of methods. FIG. 2 is an illustration of selection of a zoom region in one embodiment. The zoom region can be determined by using the end points of a diagonal line 202 drawn by the user in either view to serve as opposite corners of a bounding rectangle 204. The bounding rectangle 204 becomes the zoom region. The user can draw the diagonal line (which does not have to be straight) using any number of input devices, including but not limited to a mouse, a pen, a finger, voice commands, hand gesture, etc. If line drawn in the panoramic view 102, then the resulting zoom region is presented in zoom view 104. If a line is drawn in the zoom view, then that zoom view is further magnified to present just the region the user selected. In another embodiment, the user can select icon 200 which will set the zoom region to be centered around a mouse cursor (and having a default magnification) if the user clicks a mouse button while the cursor is one of the views. For example, if the user has selected icon 200 and then clicks a mouse button while the mouse cursor is in the panoramic view, the zoom region will occupy a region (of default size) centered around the point at which the mouse cursor was at the time of the click. It is contemplated that any input device (including those not yet conceived) used to select and manipulate devices in the video stream(s) is within the scope and spirit of this disclosure.

Figure 3:
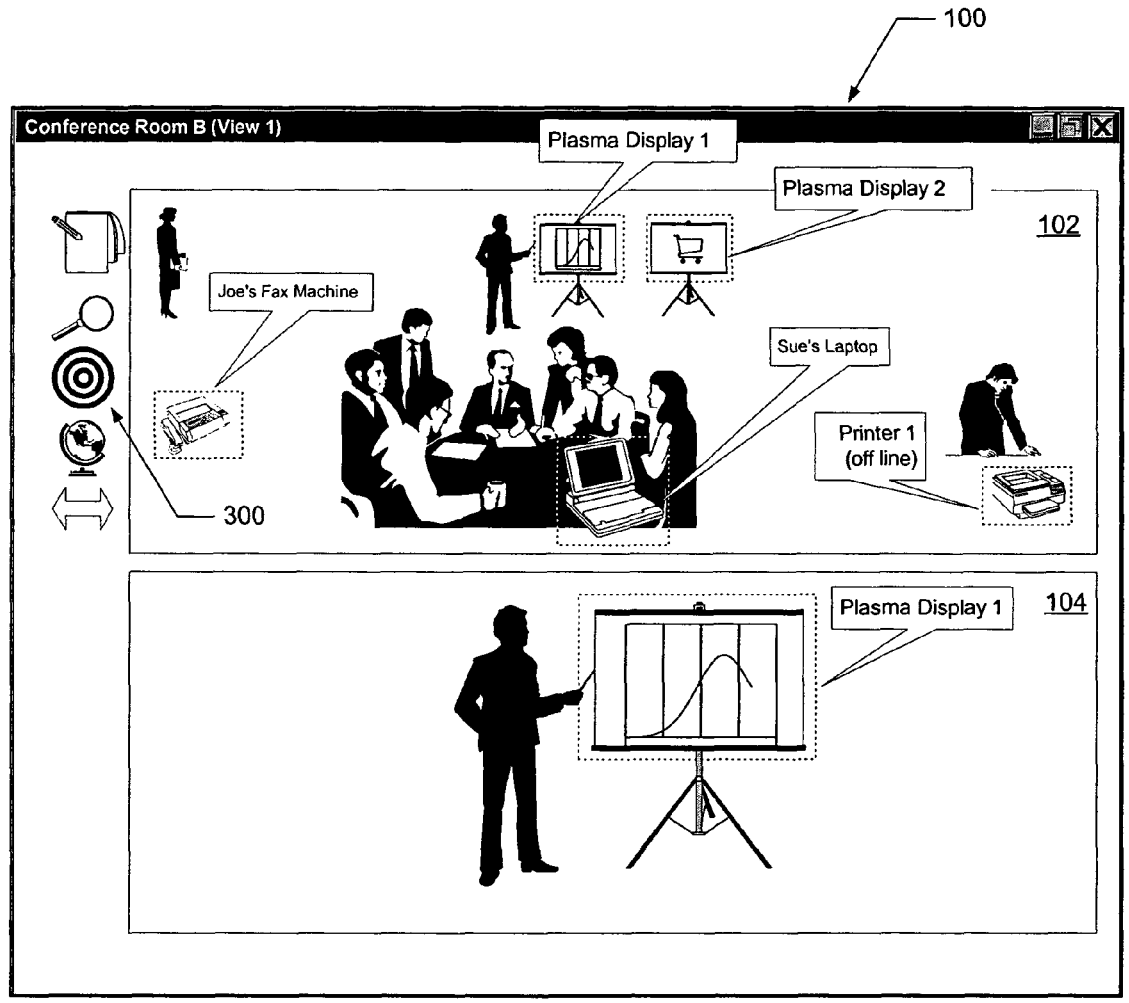
FIG. 3 is an illustration of device "hot spots" in an embodiment

In addition to merely viewing devices in the panoramic view 102 and the zoom view 104, a user can interact with devices if the devices have "hot spots" defined in one or more views. FIG. 3 is an illustration of device "hot spots" in an embodiment. A hot spot is a region of a view that intersects a device in the video image stream (e.g., display, printer, scanner, speaker, computer, light control, etc.). Devices with hot spots can be manipulated through GUI 100. Hot spots in FIG. 3 are depicted for illustrative purposes by dashed rectangles. By way of a non-limiting illustration, when a user positions a mouse cursor (or some other input device) over a hot spot, an embodiment makes the user aware of the hot spot by automatically changing the default cursor to an intuitive icon (e.g., a printer icon to indicate a printer device). Instead of or in addition to changing the mouse cursor to an icon, call out boxes can be displayed indicating the name, type of device, and/or device status. For example, there are two plasma display boards in FIG. 3 having call outs "Plasma Display 1" and "Plasma Display 2", a fax machine ("Joe's Fax Machine"), a laptop computer ("Sue's Laptop") and a printer ("Printer 1 (off line)"). In one embodiment, a user can force all hot spots and/or call outs to appear by selecting icon 300.

Device hot spots can be defined statically or dynamically. In one embodiment, static hot spots can be defined with a tool that allows a user to specify a bounding region in a view (102 or 104) and associate device attributes with that region. By way of a non-limiting example, in FIG. 1 a user could specify a hot spot for printer device 114 by drawing a rectangle around it in view 102. After doing so, an input window could appear to allow the user to specify the printer's attributes. In this example, such information could include device type (printer), make, model, network address (e.g., uniform resource locator, Internet Protocol address, etc.), and GUI behaviors. GUI behaviors can include the following:

- whether the mouse cursor (or other input device cursor) will change when it is placed over device's hot spot and if so, what it should change to;
- whether there is a call out box associated with the device and if so, what information it will contain;
- whether the device can accept a "drag" operation;
- whether the device can accept a "drop" operation; and
- whether the device has a pop-up control panel and if so, the contents of the control panel.

A device's GUI behaviors as well as its attributes can be naturally represented as a class in an objected-oriented software paradigm. In one embodiment, devices can be defined in a class hierarchy wherein more specific device types can inherit attributes and behaviors from less specific ones. By way of a non-limiting example, a "Lexmark E323" printer class could inherit from a general "LaserPrinter" class. Besides the aforementioned GUI behaviors, a device class's methods could also include handlers for GUI events such as when a mouse cursor enters or exits the device's hot spot, mouse drag, mouse drop, mouse button activity, etc. Device definitions can be stored in a device database.

In one embodiment, dynamically defined hot spots can arise when a device with a radio transmitter attached to it emits a signal that is used to locate the hot spot for the device and also identify the device. By way of a non-limiting example, such a signal could conform to IEEE 802.11, Bluetooth®, or other wireless standards. If a given location has a radio direction finder (RDF) or similar device, devices with transmitters can have hot spots assigned to them dynamically by centering a hot spot region around the source of the transmission. Alternatively, the transmission itself could carry information pertaining to the location of the device. In one embodiment, the RDF can be located on a FlySPEC. The transmission can also identify the device either as a predefined device that exists in the device database or as a generic device. If it is a generic device, a device class that closely models its attributes and behaviors can be created for it dynamically. In another embodiment, the location of a device can be determined based on acoustic signal. A commercially available acoustic location finder is the IS-600 Mark 2 Precision Motion Tracker available from InterSense (Burlington, Mass.). In either case, the device class can have information regarding the physical dimensions of the device and this can be used together with the location information to define the bounding region of the device's hot spot. If the transmitted signal does not provide the device's location, the device's distance from the RFD can be estimated based on the strength of the transmission signal or, in another embodiment, by using radar.

In one embodiment, dynamically defined hot spots can arise through image pattern recognition of devices within the view of a FlySPEC. If the video streams coming out of the FlySPEC are analyzed for shapes that designate devices (e.g., printers, scanners, video monitors, etc.), these devices can be automatically added to the device database by creating device classes on the fly to model the attributes and behaviors of the devices so recognized. In another embodiment, if a dynamically recognized device has an IR (infrared) interface (as many audio/visual devices do), its device class can include a behavior to render a control panel on the GUI. The control panel can allow GUI users to configure/control the device by sending it IR commands. Such an embodiment contemplates including an IR transmitter in same location as the device. Optionally, the IR transmitter can be part of a FlySPEC. In another embodiment, a FlySPEC can be mounted on a mobile platform, such as a robot, so that it can be repositioned within a given location, or change locations entirely. Such a configuration would allow the FlySPEC to roam and control devices as it encountered them.

Figure 4:
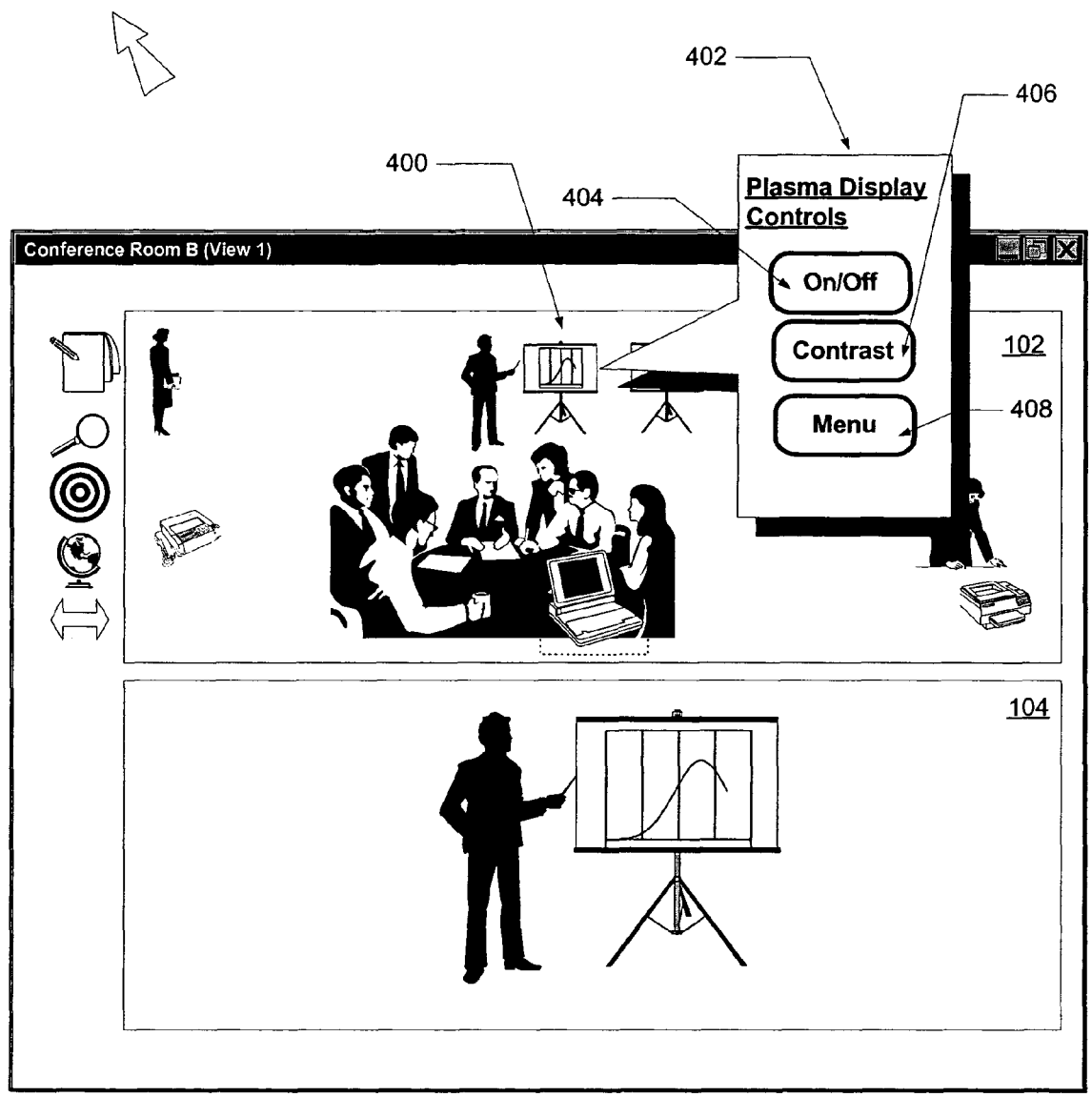
FIG. 4 is an illustration of a pop-up control panel in one embodiment.

One way for a user to interact with a device in the GUI is through a device-specific control panel. FIG. 4 is an illustration of a pop-up control panel in one embodiment. As part of a device's behavior methods, a device can have a method that renders a control panel in response to a request by the GUI. By way of a non-limiting example, this can be trigged by the user selecting a mouse button while the mouse cursor is in a device's hot spot, through a voice command, through a mouse or hand gesture, etc. By way of a non-limiting illustration, plasma display board 400 has a control panel 402 that allows a user to control the display be interacting with the video image stream in view 102. The control panel includes an on/off button 404 to turn the display on or off, a contrast button 406 to adjust the display's contrast, and a menu button 408 to access other display functions. All devices can have such pop-up control panels, which may themselves include many nested levels of GUI. Since multiple users may utilize the GUI on multiple computing devices, changes made to devices (e.g., via a control panel) by one user will be reflected in the views of all other users.

In another embodiment, users can interact with real world devices represented in video image streams by manipulating device information through a drag-and-drop metaphor. Drag and drop (D&D) works by a user selecting a source device in a GUI (e.g., by holding a mouse button down when the mouse cursor is over the device), "dragging" a representation (e.g., icon, image, etc.) of the device to another location in the GUI (e.g., by keeping the mouse button pressed down while moving the mouse cursor to the new location), and then "dropping" the representation (usually by releasing the mouse button) on a destination device. D&D is not limited to being accomplished by solely by mouse gestures. It could also be accomplished through voice commands, hand gestures, other mouse gestures, human eye tracking, etc. It will be appreciated that the present disclosure is not limited to a single user input device or method of interacting with a GUI.

Figure 5:
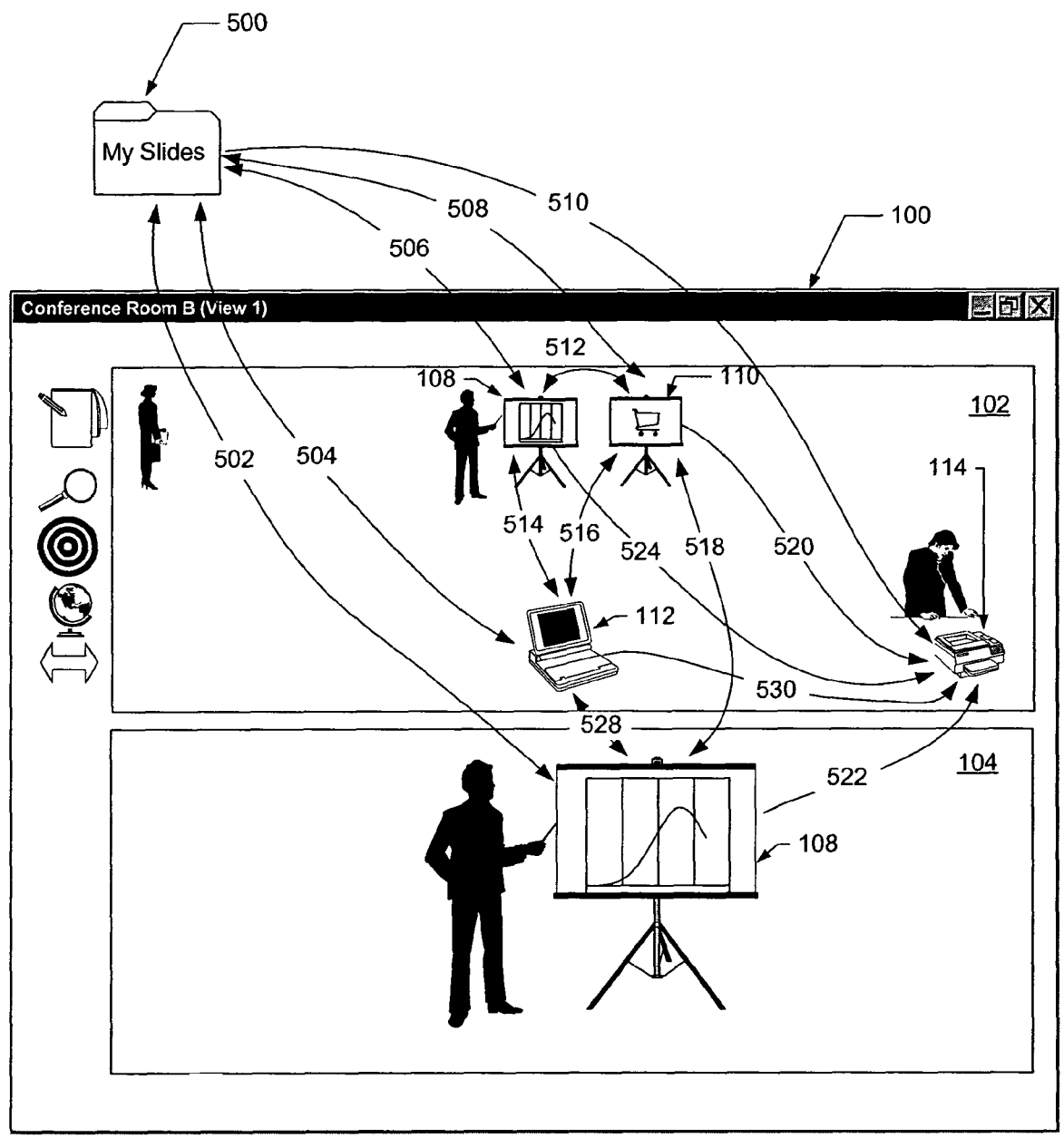
FIG. 5 is an illustration of drag and drop possibilities in one embodiment.

FIG. 5 is an illustration of drag and drop possibilities in one embodiment. The nonlinear lines in FIG. 5 illustrate possible drag and drop sources and destinations by connecting them to each other, but do not indicate or mandate any particular order of operations or any particular technique for manipulating an input device such as a mouse. Local icon 500 represents a file and/or information that exists on a user's computing device, and is visible to the user along with GUI 100. In one embodiment, the icon is visible on the computing device's desktop metaphor or other GUI. A user can drag the source file/information 500 and drop it onto a device in one of the video views 102 or 104 (e.g., destination displays 108 or 110, printer 114, and/or computing device 112). When a user attempts to drop the file/information onto the aforementioned devices, the GUI can query the device class to see if it has a behavior method that can accept the "drop" request. If so, the drop operation is allowed. If not, the mouse cursor could change to reflect the fact that device is not a drop target (e.g., the mouse cursor could change to an "X"). If the device can accept the drop request, the file/information 500 is actually transferred (i.e., copied or moved) to the device. By way of a non-limiting example, if the destination device is a display (502, 506, 508), the file/information can be displayed on the device. If the destination device is a printer (510), the file/information can be printed. If the destination device is computing device (504), the file/information can be transferred to the computing device. If the destination device is a mobile phone (not shown), the file/information is transferred to the phone. It will be appreciated that any device capable of communicating over a communication channel—not those listed here merely for illustrative purposes—can potentially be part of such a D&D scheme. It will further be appreciated that a file/information can contain any type of digital information, including but not limited to images, sounds, documents, slide presentations, audio/visual presentations, and streaming media. Of course, when one user performs a D&D operation that causes a change in a view, that change will be evident to all other users who happen to be sharing that view (through other instances of the GUI).

In addition to dragging files/information from the user's local computing device to devices that appear in the live video views, the opposite also holds true. A user can drag information from a device in a video view (102 or 104) to the user's local device's desktop metaphor or file system. During the operation, the mouse cursor can change to represent the type of file/information that is being transferred. By way of a non-limiting example, if the source of the D&D operation is a display device, the mouse cursor can be changed to a thumbnail sketch of the current display on the display device. A file/information dragged from a display device and dropped on the user's computing device (502, 506, 508) can contain a representation of the graphical information that was rendered on the display device at the time the D&D operation took place. In one embodiment, display devices (or processes that manage them) can implement image stacks. An image stack acts like a stack data structure (i.e., first-in, first-out) where the image on the top of the stack is the image that is actually displayed. When an file is "dropped" on a display, it is added to the top of the stack. When an image is "dragged" from a display, it is removed from the top of the stack and the new top of the stack is then displayed in its place. Again, when one user performs a D&D operation that causes a change in a view, that change will be evident to all other users who happen to be sharing that view (through other instances of the GUI).

In addition to dragging files/information to and from a user's computing device, files or information can be dragged to/from a devices that appear in views. By way of a non-limiting example, files/information can be dragged between displays (512, 518). In one embodiment, when a file/information is dragged from one display to another, the top of the source display device's image stack is removed and placed on the top of the destination display device's image stack. This has the effect of dragging an image from one display to another. Information/files can also be dragged between displays and computing devices (514, 516), between displays and printers (520, 524, 522), and from computing devices to printers (530). Again, when one user performs a D&D operation that causes a change in a view, that change will be evident to all other users who happen to be sharing that view (through other instances of the GUI).

Figure 6:
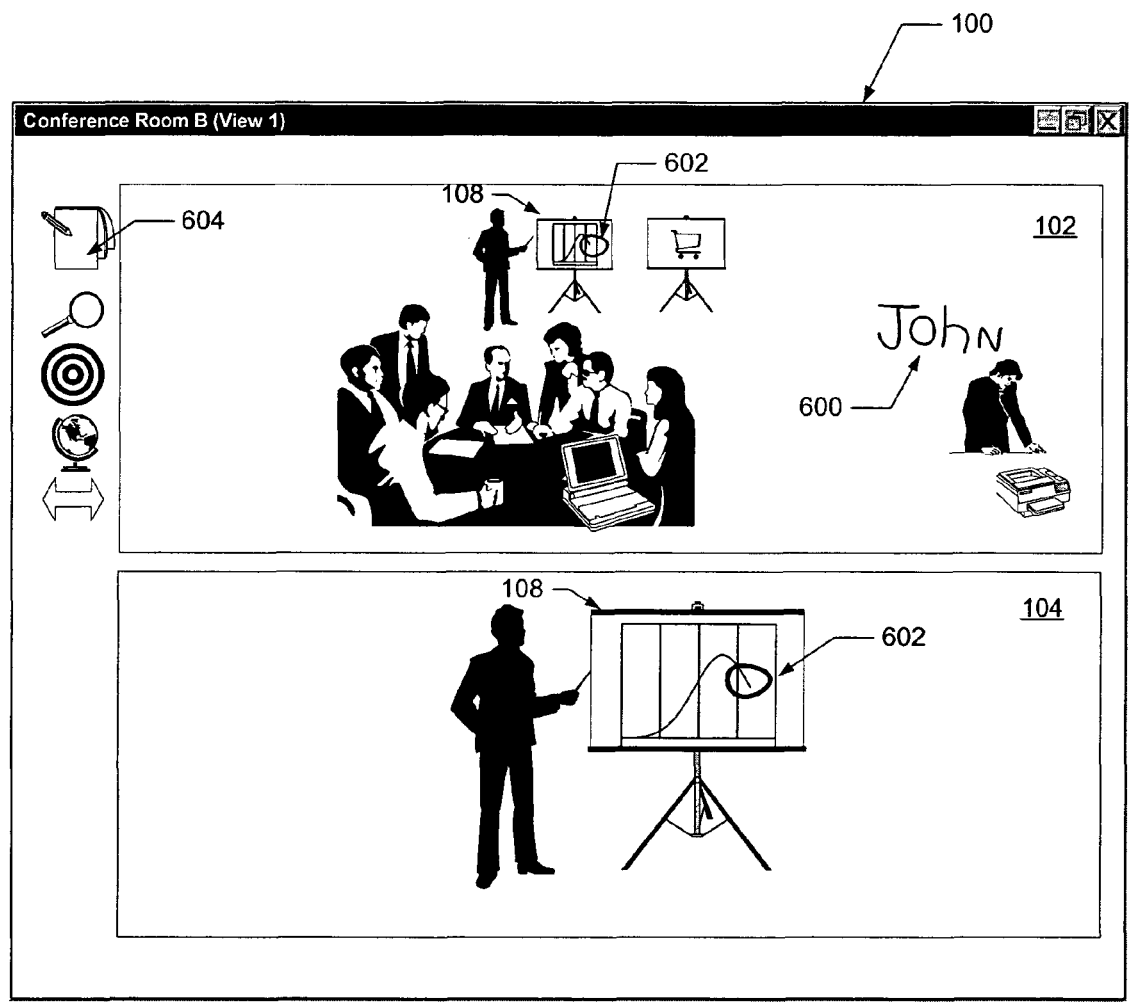
FIG. 6 is an illustration of annotations in one embodiment.

In another embodiment, users can interact with devices and views by annotating them. FIG. 6 is an illustration of annotations in one embodiment. In one embodiment, an annotation tool 604 can be provided to allow users to make annotations (e.g. notes, drawings, etc.) on a view (102, 104) and/or on a device as it appears in a view. When one user creates/changes/deletes an annotation, the result is visible to all other users who happen to be sharing that view (through other instances of the GUI). Annotation 600 is a hand-written name of a meeting participant ("John") that in one embodiment can be drawn with a mouse after selecting annotation tool 604 in GUI 100. Annotation 602 is an example of an annotation drawn on display device 108 as it appears in a view. In this case, a user has circled a portion of the graph being displayed in one of the views (102, 104). If the display device (or its display management process) has implemented an image stack, the annotation can be applied to the image on the top of the stack (i.e., the currently displayed image). In one embodiment, if the annotation even partially overlaps the display device, it will be applied in its entirety to the top of the device's image stack. In another embodiment, only the portion of the annotation that overlaps with the display device will be applied to the device's image stack. All other users viewing that device will see the annotation (including viewers who are actually present where the device is located). In addition, the annotation can also be visible in the zoom view 104 if it is encompassed by the zoom region.

Figure 7:
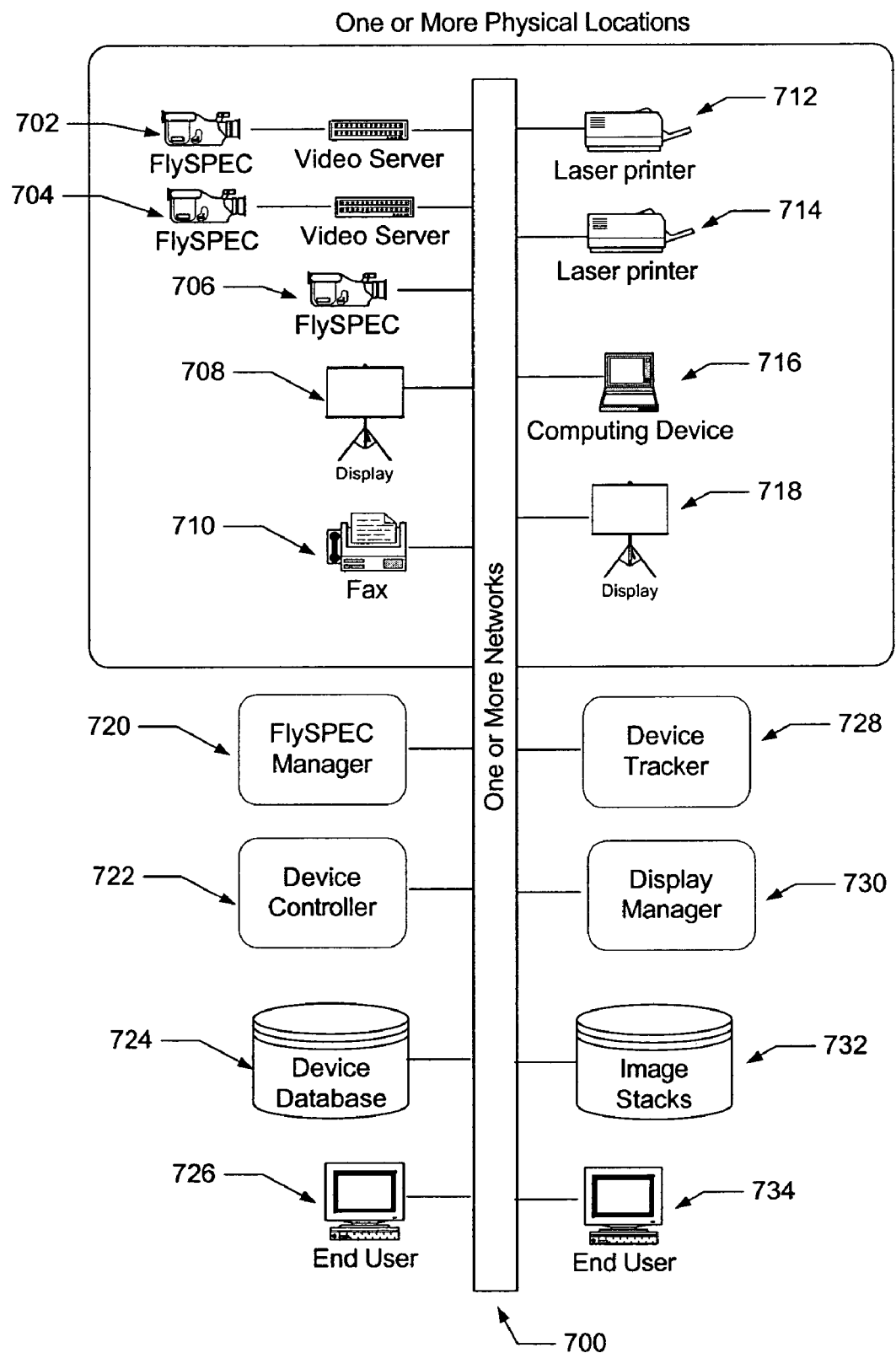
FIG. 7 is an illustration of a system for a shared interactive environment in one embodiment.

FIG. 7 is an illustration of a system for a shared interactive environment in one embodiment. Although this diagram depicts processes as functionally separate, such depiction is merely for illustrative purposes. It will be apparent to those skilled in the art that the processes portrayed in FIG. 7 can be arbitrarily combined or divided into separate software, firmware or hardware components. Furthermore, it will also be apparent to those skilled in the art that such devices, irregardless of how they are combined or divided, can execute on the same computing device or can be arbitrarily distributed among different computing devices connected by a network.

Physical devices and the processes that enable manipulating them in a shared interactive environment can all be connected by one or more networks 700 (e.g., the Internet). Devices (702-718) may be distributed in one or more separate physical locations. Each location that is part of the shared interactive environment that has one or more FlySPEC devices. FlySPEC devices may have attached video server hardware (702, 704) to improve the performance of delivering image streams to multiple users. In one embodiment, one or more FlySPEC Manager processes 720 configure and control the FlySPEC devices. In one embodiment, the FlySPEC manager process can capture video streams from fixed cameras (on FlySPEC device(s)) and stitch them into a panoramic video stream in real-time. Video streams from the FlySPEC devices and/or the FlySPEC manager(s) are provided to one or more end user computing devices (726, 734), depending on which locations and views are selected for viewing on each. Each end user computing device runs an instance of the GUI 100. One or more device controllers 722 are responsible for controlling the devices (702-718) based on ender user interaction with the GUI (e.g., through control panels, D&D, etc.). One or more device databases 724 can contain information (e.g., device classes) for each device (702-718), including devices that are dynamically added via image pattern recognition or RFD. In another embodiment, end user computing devices (726, 724) running instances of GUI 100 can be situated in a location and manipulated with other instances of GUI 100 executing on other devices.

Device tracker 728 is responsible for keeping track of newly discovered devices (e.g., devices that are discovered through radio frequency transmission or image pattern recognition). The device tracker creates new classes for these devices, defines their hot spots, updates the device database(s), and informs any affected GUI's of the new hot spots so that the end users may then interact with the new devices. Display manager 730 is responsible for managing image stacks for all display devices (708, 718) that utilize them. Device controller 722 is responsible for sending commands to devices (702-718) to carryout end user interactions, such as through popup control panels or D&D.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for exchanging information in a shared interactive environment, comprising:
 selecting a first object wherein the first object is one of 1) a first physical device at a remote location shown in a live video image, and 2) an icon on a computing device, wherein the live video image shows a view of the remote location which includes a plurality of physical devices including the first physical device;
 causing information associated with the first object to be transferred to a second object wherein the second object is the other of 1) the first physical device at the remote location shown in the live video image, and 2) the icon on the computing device;
 annotating the view of the remote location shown in the live video image with an annotation;
 automatically transferring the annotation to the first physical device if the annotation is at least partially drawn over the first physical device as it appears in the live video image;
 displaying the annotation on the first physical device such that the annotation can be viewed at the remote location;
 wherein the first physical device has a dynamically defined hotpot in the live video image;
 wherein the transfer is brought about by manipulating a visual representation of the information in the live video image;
 wherein manipulating includes interacting with the first object in the live video image and the second object; and
 wherein the first physical device is part of the shared interactive environment.

2. The method of claim 1 wherein:
 the manipulation is accomplished by dragging the representation from the first object and dropping the representation on the second object.

3. The method of claim 1 wherein:
 changes to the first physical device are visible to all participants in the shared interactive environment.

4. The method of claim 3 wherein:
 each of the at least one participants can interact with the shared interactive environment through different computing devices.

5. The method of claim 1 wherein:
 the first physical device can include a display, a projector, a printer, a facsimile machine, a personal digital assistant, a computer, and a portable computer.

6. The method of claim 1 wherein:
the information can include a digital file, a sound, and an audio/video presentation.

7. The method of claim 1 wherein:
the first physical device has associated with it a pop-up control panel through which a user can configure and control it.

8. The method of claim 1 wherein:
the live video image is one of: a panoramic view and a zoomed view.

9. A method for exchanging information in a shared interactive environment, comprising:
selecting a first remote physical device in a first live video image that shows a first view of the shared interactive environment, wherein information is associated with the first remote physical device;
causing the information to be transferred to a second remote physical device shown in a second live video image that shows a second view of the shared interactive environment, wherein the transfer is brought about by manipulating a visual representation of the information shown in the first live image by interacting with the first live video image and the second live video image,
querying the second remote physical device to determine if it can receive the information from the first remote physical device, and
transferring the information from the first remote physical device to the second remote physical device;
wherein at least one of the first remote physical device and the second remote physical device has a statically or dynamically defined hotspot in the first live video image or the second live video image;
wherein the first remote physical device and the second remote physical device are part of the shared interactive environment; and
wherein the first remote physical device and the second remote physical device are different remote physical devices.

10. The method of claim 9 wherein:
the manipulation is accomplished by dragging the representation from the first physical device and dropping the representation on the second physical device.

11. The method of claim 9 wherein:
changes to the physical devices are visible to all participants in the shared interactive environment.

12. The method of claim 9 wherein:
a physical device can include a display, a projector, a printer, a facsimile machine, a personal digital assistant, a computer, and a portable computer.

13. The method of claim 9, further comprising:
annotating at least one of the first live video image and the second live video image.

14. The method of claim 13, further comprising:
automatically transferring the annotation to a physical device if the annotation is at least partially drawn over the physical device as it appears in a live video image.

15. The method of claim 9 wherein:
the first live video image and the second live video image are the same.

16. The method of claim 9 wherein:
the information can include a digital file, an annotation, a sound, and an audio/video presentation.

17. The method of claim 9 wherein:
at least one of the first physical device and the second physical device has associated with it a pop-up control panel through which a user can configure and control it.

18. A shared interactive environment, comprising:
a camera system to provide a first live view of a location and a second live view of the location, wherein the second live view can be configured to zoom in on a portion of the first live view, and wherein each live view shows a different view of a plurality of physical devices at the location;
a first graphical user interface (GUI) coupled to the camera system which presents the first live view and the second live view, wherein each view shows one or more of the plurality of physical devices at the location, wherein information is associated with at least one physical device in the first live view;
a device controller to dynamically control the physical device in response to interaction of a first user with the GUI wherein the interaction can include annotating at least one of: 1) the first live view of the location; and 2) the second live view of the location;
wherein annotations are automatically transferred to the physical device in the live views if the annotation is at least partially drawn over the physical device as it appears in the live video image, and wherein the annotation is displayed on the physical device such that the annotation can be viewed at the location;
wherein interaction can include causing the information to be transferred from the at least one physical device to a second physical device in the second live view, wherein the transfer is brought about by manipulating a visual representation of the information by interacting with the first live view and the second live view;
a device tracker coupled to the camera system and to dynamically recognize new physical devices; and
wherein the camera system can be mounted on a mobile, robotic platform.

19. The shared interactive environment of claim 18, wherein:
the first GUI allows the first user to interact the physical device; and
wherein the interaction of the first user is apparent to a second user via a second GUI.

20. The shared interactive environment of claim 18, wherein:
the device controller can control the physical device through at least one of: 1) an infrared communication channel; and 2) one or more networks.

21. The shared interactive environment of claim 18, wherein:
the device tracker can recognize new physical devices by at least one of: 1) image pattern recognition; 2) radio frequency transmission; and 3) acoustic signal.

22. The shared interactive environment of claim 18, wherein:
the physical device can be a display; and
wherein the display can include an image stack.

23. The shared interactive environment of claim 19, wherein:
the first GUI can provide a second live view that is different from the second live view provided by the second GUI.

24. The shared interactive environment of claim 18, wherein:
the GUI is implemented as one or more web pages.

25. The shared interactive environment of claim 18, wherein:
the first user can select the second live view by drawing a diagonal in the first live view.

26. The shared interactive environment of claim 18, wherein:

the physical device has a pop-up control panel that can be made apparent to the first user through the first GUI; and wherein the pop-up control panel allows the first user to control and configure the physical device.

27. The shared interactive environment of claim 18, wherein:

the physical device can be represented by a set of attributes and a set of behaviors.

28. The shared interactive environment of claim 27, wherein:

the representation of the physical device is part of a device hierarchy.

29. A non-transitory computer readable memory having instructions stored thereon that when executed by a processor cause a system to:

select a first remote physical device in a first live video image that shows a first view of the shared interactive environment, wherein information is associated with the first remote physical device;

cause the information to be transferred to a second remote physical device shown in a second live video image that shows a second view of the shared interactive environment, wherein the transfer is brought about by manipulating a visual representation of the information by interacting with the first live video image and the second live video image, querying the second remote physical device to determine if it can receive the information from the first remote physical device, and transferring the information from the first remote physical device to the second remote physical device;

wherein at least one of the first remote physical device and the second remote physical device has a statically or dynamically defined hotspot in the first live video image or the second live video image;

wherein the first remote physical device and the second remote physical device are part of the shared interactive environment; and wherein the first remote physical device and the second remote physical device are different remote physical devices.

30. The computer readable memory of claim 29 wherein:

the manipulation is accomplished by dragging the representation from the first physical device and dropping the representation on the second physical device.

31. The computer readable memory of claim 29 wherein:

changes to the physical devices are visible to all participants in the shared interactive environment.

32. The computer readable memory of claim 29 wherein:

a physical device can include a display, a projector, a printer, a facsimile machine, a personal digital assistant, a computer, and a portable computer.

33. The computer readable memory of claim 29 further comprising instructions that when executed cause the system to:

annotate at least one of the first live video image and the second live video image.

34. The computer readable memory of claim 29 wherein:

automatically transferring the annotation to a physical device if the annotation is at least partially drawn over the physical device as it appears in a live video image.

35. The computer readable memory of claim 29 wherein:

the first live video image and the second live video image are the same.

36. The computer readable memory of claim 29 wherein:

the information can include a digital file, an annotation, a sound, and an audio/video presentation.

37. The computer readable memory of claim 29 wherein:

at least one of the first physical device and the second physical device has associated with it a pop-up control panel through which a user can configure and control it.

38. A system, comprising:

means for selecting a first remote physical device in a first live video image that shows a first view of the shared interactive environment, wherein information is associated with the first remote physical device;

means for causing the information to be transferred to a second remote physical device shown in a second live video image that shows a second view of the shared interactive environment, wherein the transfer is brought about by manipulating a visual representation of the information by interacting with the first live video image and the second live video image, querying the second remote physical device to determine if it can receive the information from the first remote physical device, and transferring the information from the first remote physical device to the second remote physical device;

wherein at least one of the first remote physical device and the second remote physical device has a statically or dynamically defined hotspot in the first live video image or the second live video image;

wherein the first remote physical device and the second remote physical device are part of the shared interactive environment; and wherein the first remote physical device and the second remote physical device are different remote physical devices.

* * * * *